R. E. WINCHESTER.
COLLAPSIBLE SEAT BACK.
APPLICATION FILED OCT. 14, 1919.
1,405,651.
Patented Feb. 7, 1922.
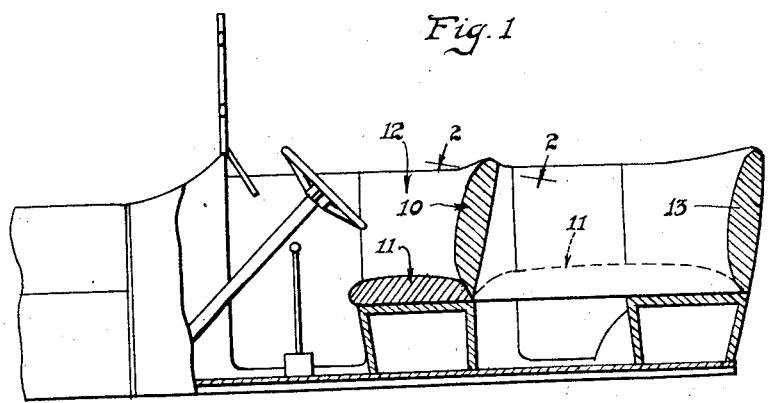
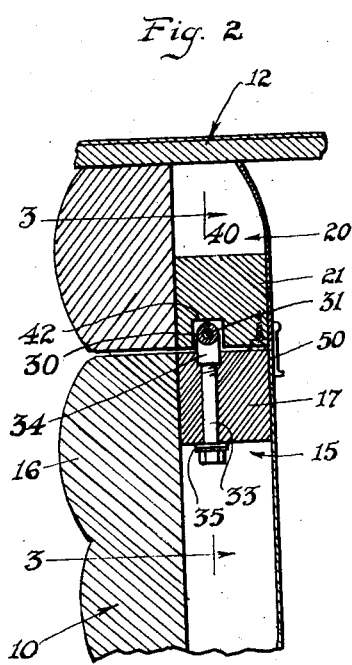
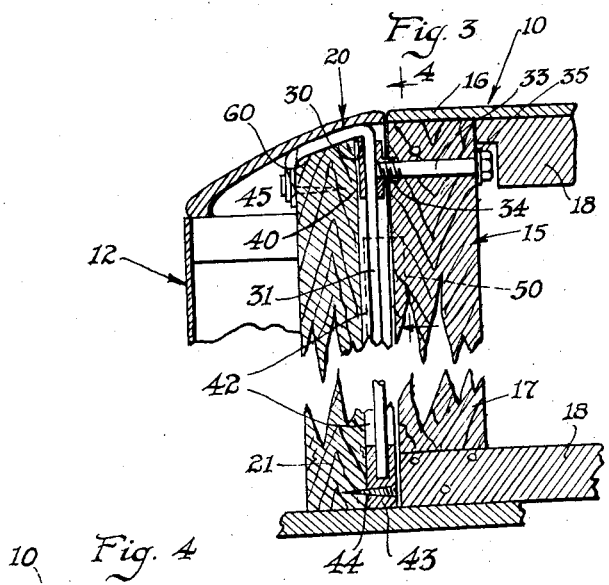
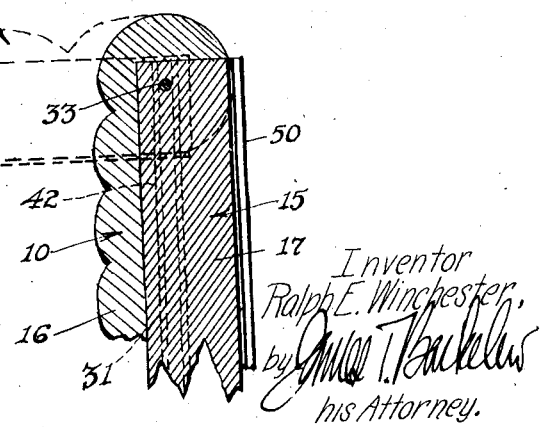
Inventor
Ralph E. Winchester,
by [signature]
his Attorney.

UNITED STATES PATENT OFFICE.

RALPH E. WINCHESTER, OF LOS ANGELES, CALIFORNIA.

COLLAPSIBLE SEAT BACK.

1,405,651.  Specification of Letters Patent.  Patented Feb. 7, 1922.

Application filed October 14, 1919. Serial No. 330,629.

*To all whom it may concern:*

Be it known that I, RALPH E. WINCHESTER, a citizen of the United States, residing at Los Angeles, in the county of Los Angeles, State of California, have invented new and useful Improvements in Collapsible Seat Backs, of which the following is a specification.

This invention relates to folding seat backs and particularly to folding automobile seat backs. It is an object of the invention to provide a simple, inexpensive and effective folding seat back construction.

An object of the invention is to provide a simple and effective folding or collapsible seat back for automobiles which makes it possible to lower the back of the front seat of a car into a horizontal position so that it may be arranged to co-operate with the seat cushions, etc., to form a bed in the car. The simplicity of the construction is an important feature of the invention as it not only makes the device inexpensive to manufacture but also makes it simple and convenient to operate.

A further object of the invention is to provide a seat construction for automobiles which will not materially weaken or affect the body of the car. The construction provided by the invention makes the body of the car as strong and rigid as the ordinary body construction now in common use and is at the same time neat and sightly.

There are further objects and features of the invention which will be readily understood from the following detailed description of a specific preferred form of the invention throughout which reference is had to the accompanying drawings, in which—

Fig. 1 is a side elevation of a portion of an ordinary automobile with parts broken away to show in section; Fig. 2 is an enlarged detailed section taken as indicated by line 2—2 on Fig. 1; Fig. 3 is an enlarged section taken as indicated by line 3—3 on Fig. 2; and Fig. 4 is a section taken as indicated by line 4—4 on Fig. 3.

Throughout the drawings numeral 10 designates the back of the front seat of the automobile and numeral 11 designates the seat cushion of the front seat. The back 10 is connected to the side walls 12 of the body of the machine so that it may be lowered into the position of the seat cushion 11 when the seat cushion 11 has been removed. A very comfortable bed is formed in the car when the back 10 of the front seat has thus been arranged in the position of the seat cushion 11 and the seat cushion 11 and the seat cushion of the rear seat have been placed between the seat back 10 and the rear seat back 13 so that they are longitudinal of the car and are in the same horizontal plane as the seat back 10.

The back 10 of the front seat comprises a wooden frame 15 on which is mounted suitable upholstering 16. The frame 15 comprises uprights or end posts 17 which extend upwardly from the ends of the lower transverse frame member 18. The upper transverse frame member 18 extends between the upper ends of the end posts 17. It will be understood that the body construction or frame construction herein described is merely typical and that the invention is not limited in any way to such construction.

The back 10 extends between two oppositely disposed inwardly extending portions 20 of the side walls 13 at the inner edges of which are stationary uprights 21. The uprights 21 and the uprights 17 are normally parallel with each other and are substantially of the same height. The back 10 is attached or connected at its upper corners to the portions 20 of the side walls 13, by sliders 30 which are suitably connected to the uprights 17 and are slidable on vertical guide rods 31 which are attached to the uprights 21. The sliders 30 are connected to the uprights 17 by means of bolts 33 which extend through the uprights 17 and screw thread into portions 34 of the sliders. The bolts 33 are free to rotate in the uprights 17 and suitable washers 35 are provided between the heads of the bolts and the surfaces of the uprights. The sliders 30 are provided with bores 40, at right angles to the bolts 33, in which are carried the guide rods 31. The rods 31 extend through grooves 42 in the uprights and are carried at their lower ends in blocks 43 which fit in the lower ends of the grooves 43 and are held in position by suitable screws 44. The upper ends of the rods 31 extend through grooves 60 in the upper ends of the uprights 21 as clearly shown in Fig. 3 and are attached to the inner surfaces of the uprights 21 by means of screws 45. The grooves 42 extend the entire length of the uprights 21 and are large enough to allow the sliders 30 to move up and down on the rods 31.

It will be noted in the drawings that the bolts 33 are at the upper ends of the uprights 17 and that the rods 31 are near the forward side of the uprights 21. This construction makes it possible to lift or swing the lower portion of the back 10 forward and upward until the back is in a horizontal position. This swinging up of the back 10 is about the axis of the bolts 33. When the back is swung up to a horizontal position (as shown in dotted lines in Fig. 4) it can be lowered by allowing the sliders 30 to move downwardly on the rods 31 until the back 10 is in the position of the seat cushion 11. When the back 10 is in its normal position, that is, when the back 10 is in a vertical position, it is prevented from swinging rearwardly by beading 50 which is mounted on the uprights 21 so as to extend inwardly and engage the rear sides of the uprights 17 as clearly shown in Fig. 2. The beading does not extend high enough on the uprights 21 to interfere with the movement or swinging of the seat back 11 into a horizontal position.

Having described a specific preferred form of my invention I do not wish to limit myself to the details herein set forth but wish to reserve to myself any changes or modifications that may appear to those skilled in the art or fall within the scope of the following claims.

Having described a preferred form of my invention, I claim:

1. In an automobile body having side walls with oppositely disposed upright parts, a seat back arranged between said parts, the seat back being slidably hinged at its upper corners to the upright parts to be movable to a horizontal position directly from its normal operating position and be vertically movable while in a horizontal position, said connections being the only connections between the seat back and the upright parts.

2. In an automobile body having side walls with oppositely disposed upright members, a seat back extending between the upright members, the seat back being slidably hinged at its upper corners to the upright members and adapted to be swung into a horizontal plane and moved vertically, the connections between the upright members and the seat back comprising members pivotally mounted on the seat back and slidably connected to guides on the upright members.

3. In an automobile body having side walls with oppositely disposed upright members, a seat back extending between the upright members, the seat back being slidably hinged at its upper corners to the upright members and adapted to be swung into a horizontal plane and moved vertically, the connection between the upright members and the seat back comprising sliders pivotally mounted on the seat back, the sliders having bores in which are slidably carried rods connected to the upright members.

4. In an automobile body having side walls with oppositely disposed upright members, a seat back extending between the upright members, the seat back being slidably hinged at its upper corners to the upright members and adapted to be swung into a horizontal plane and moved vertically, the connection between the upright members and the seat back comprising rods connected to the upright members and extending through grooves in the upright members, and sliders pivotally mounted on the seat back, the sliders having bored portions through which the rods extend and which are adapted to slide in the grooves.

5. In an automobile body having side walls, a seat structure at the front portions of the body embodying, a seat, oppositely disposed upright parts at the side walls, a back slidably hinged at its upper portion to said parts and adapted to be swung to a horizontal position and moved vertically, and members on said parts to prevent backward movement of the back from its normal operating position and to cover the joints between the back and said parts.

In witness that I claim the foregoing I have hereunto subscribed by name this 26th day of September, 1919.

RALPH E. WINCHESTER.

Witness:
VIRGINIA I. BERINGER.